A. A. MATHISON.
BEET HARVESTER.
APPLICATION FILED MAR. 22, 1917. RENEWED OCT. 3, 1918.
1,297,298.
Patented Mar. 11, 1919.
3 SHEETS—SHEET 1.
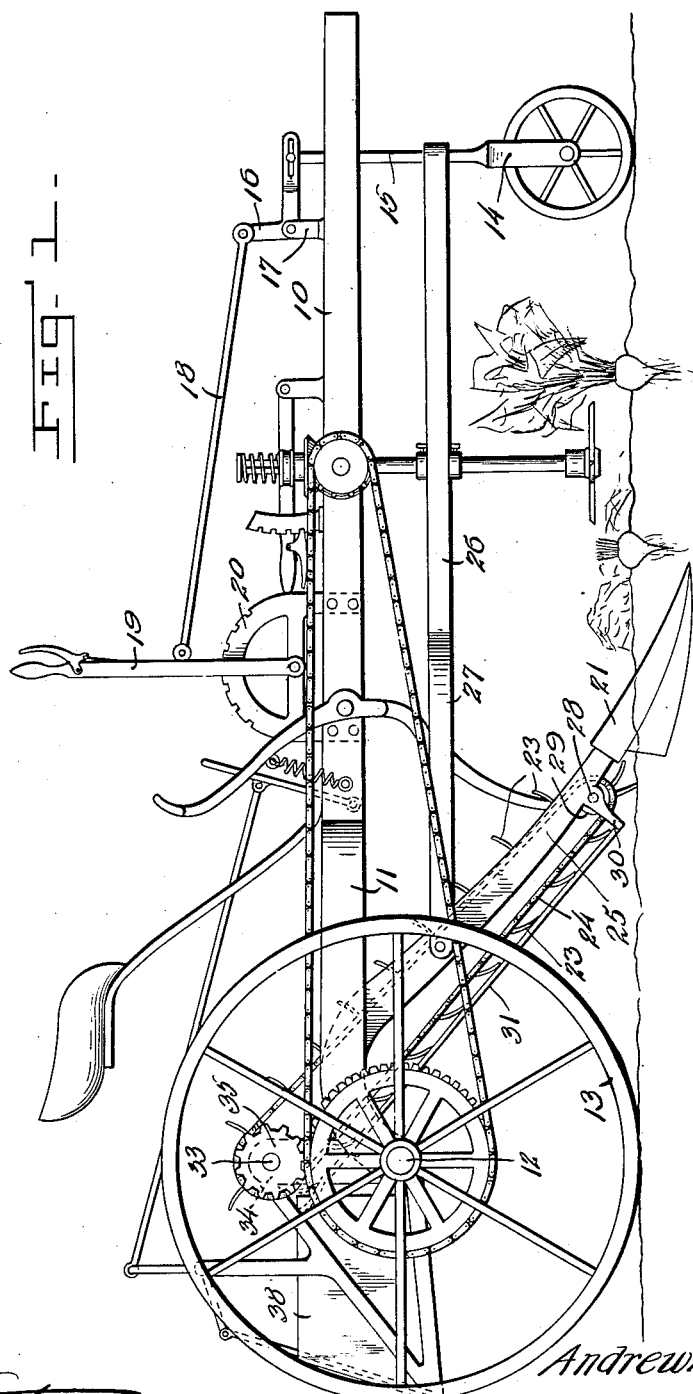
INVENTOR
Andrew A. Mathison
WITNESSES
BY
ATTORNEY

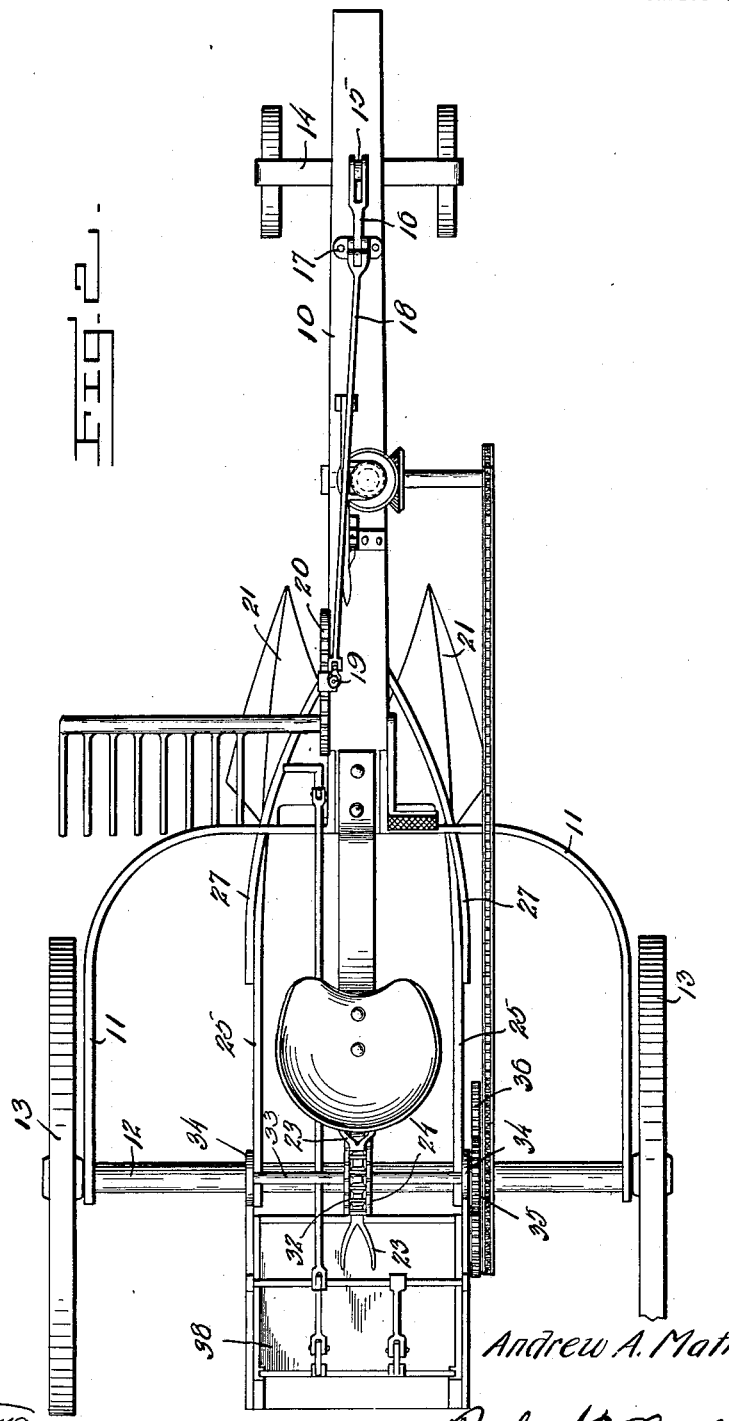

A. A. MATHISON.
BEET HARVESTER.
APPLICATION FILED MAR. 22, 1917. RENEWED OCT. 3, 1918.
1,297,298.
Patented Mar. 11, 1919.
3 SHEETS—SHEET 3.
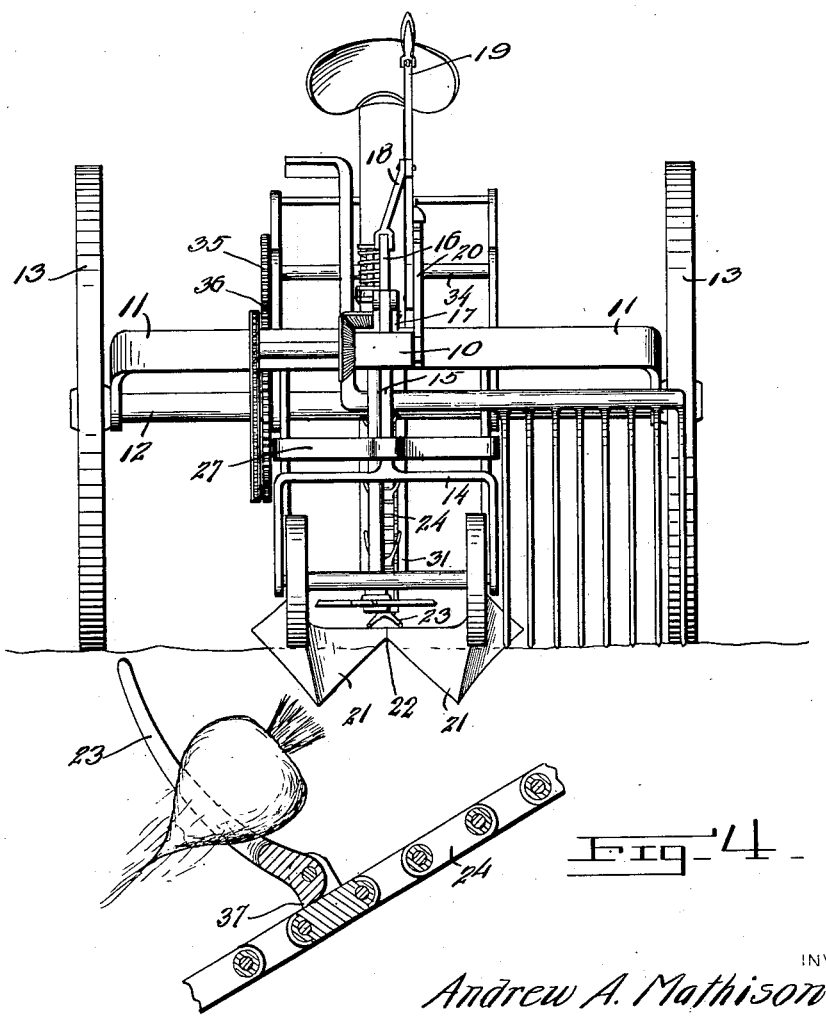

# UNITED STATES PATENT OFFICE.

ANDREW ALOIS MATHISON, OF VONTRESS, TEXAS.

BEET-HARVESTER.

1,297,298.   Specification of Letters Patent.   Patented Mar. 11, 1919.

Application filed March 22, 1917, Serial No. 156,685. Renewed October 3, 1918. Serial No. 256,760.

*To all whom it may concern:*

Be it known that I, ANDREW ALOIS MATHISON, a citizen of the United States, residing at Vontress, in the county of Haskell and State of Texas, have invented certain new and useful Improvements in Beet-Harvesters, of which the following is a specification.

This invention relates to an improved beet harvester and the principal object of the invention is to provide improved means for lifting the beets out of the ground and carrying them to a receptacle carried by the frame of the machine and to further provide the carrying means or conveying means with improved beet engaging or gripping means so mounted that the engaging forks will extend in an operative position while traveling upwardly and will drop to an inoperative position when moving downwardly.

Another object of the invention is to so construct this machine that the lifting means may be driven from the rear axle which axle will constitute a driving shaft.

This invention is illustrated in the accompanying drawings, wherein:—

Figure 1 is a view showing the improved beet harvesting machine in side elevation, Fig. 2 is a view showing the improved beet harvesting machine in top plan, Fig. 3 is a view showing the improved beet harvesting machine in front elevation Fig. 4 is an enlarged fragmentary sectional view through the conveyer chain.

The beet harvester is provided with a frame or carriage having a main beam 10 provided at its rear end with side arms or forks 11, which are connected with the axle 12 forming a driving shaft and carrying supporting wheels 13 serving to support the rear end portion of the harvester and further serving to rotate the axle as the machine moves across the field. The forward end portion of the carriage or frame is supported by a truck 14 including a standard 15 which slidably passes through the forward end portion of the main bar 10 and is engaged by the bell crank lever 16 pivotally mounted as shown at 17 by bearing brackets and engaged by the draw-rod 18 leading from the latch lever 19 which latch lever is positioned in operative relation to the rack 20. By means of this latch lever 19, the forward end portion of the carriage may be vertically adjusted and thus the depth to which the digging means will enter the ground controlled.

The digging blades or shovels 21 are substantially triangular in shape and meet as shown in Fig. 3 so that as these shovels pass through the ground, they will engage the beets and lift them out of the ground, the shape of the shovels leading the beets to a point 22 where they may be engaged by the forks 23 carried by the sprocket chain 24. These shovels 21 are carried by supporting bars 25 mounted upon the axle and braced by the yoke or fork 26 mounted upon the standard 15 of the forward truck and having its arms 27 connected with the bars 25. These bars carry a shaft 28 to mount the sprocket wheel 29 for the sprocket chain 24 and further carry depending arms 30 for supporting a strip 31 positioned beneath the sprocket chain or endless conveyer 24 so that the forks 23 upon the lower flight of the chain may rest upon this supporting strip. This chain passes about an upper sprocket wheel 32 mounted upon a shaft 33, the shaft 33 being rotatably supported in bearing arms 34 and provided with a gear wheel 35 meshing with a larger gear wheel 36 carried by the driving shaft 12. It will thus be seen that when the machine is in motion, movement will be transmitted to the shaft 33 and through the medium of the sprocket wheel 32 movement will be transmitted to the sprocket chain 24 and the sprocket chain caused to travel about the sprocket wheels 32 and 29. While the forks are traveling downwardly, they will rest upon the supporting strip 31 but upon reaching the sprocket wheel 29, they will move to the position shown in Figs. 1 and 4 to engage a beet and carry the beet upwardly. In order to prevent the forks from moving beyond the position shown in Fig. 4, each fork has been provided with a heel 37 which limits its pivotal movement in one direction and holds it in the position shown in Fig. 4.

When in use, this machine is driven across the field, it having been first adjusted for proper depth of cutting into the ground and for proper cutting of the beet tops and as it moves across the field, the shovels 21 lift the beets from the ground and move them to a position where they will be engaged by the forks of the endless conveyer. These forks engage the beets as shown in Fig. 4 and carry them upwardly and deposit them in the receptacle 38 where they will be retained until the receptacle is filled. It is of course understood that before the beets are lifted from the ground the tops will have been removed from the roots by the cutting mechanism. If it is found that the shovels are cutting too deep into the ground or not deep enough this can be remedied by adjustment of latch lever 19 to raise or lower the shovels accordingly to which is necessary. Means for propelling the machine across the field have not been shown but it is understood that any means desired can be provided.

What is claimed is:—

1. In a beet harvesting machine a frame, a driving shaft, a driven shaft, shovel supporting arms having their upper end portions mounted upon said driving shaft, a lower shaft carried by and extending between the lower end portions of said supporting arms, sprocket wheels carried by the driven shaft and lower shaft, a sprocket chain passing about the sprocket wheels, a supporting strip positioned beneath the lower flight of the sprocket chain, engaging forks pivotally connected with the sprocket chain and resting upon and held in an inoperative position by the supporting strip when moving downwardly and swinging to an operative position when moving upwardly for engaging beets and conveying the same upwardly, and means for transmitting rotary movement from the driving shaft to the driven shaft.

2. In a beet harvesting machine a frame, a driving shaft carried by said frame, a driven shaft carried by said frame, shovel supporting arms extending beneath said frame, a sprocket wheel rotatably mounted between the lower end portions of the supporting arms, a sprocket wheel mounted upon the driven shaft, a sprocket chain passing about the sprocket wheels, engaging forks pivotally connected with the sprocket chain for engaging beets and conveying the beets upwardly, a supporting strip positioned beneath the lower flight of the chain and engaging the forks and holding the forks in an inoperative position, and means for transmitting rotary movement from the driving shaft to the driven shaft.

3. In a beet harvesting machine a frame, a driven shaft rotatably connected with the frame, shovel supporting arms extending beneath the frame, an endless conveyer passing about the driven shaft and having a rotatable support between the lower end portions of the supporting arms, said endless conveyer including engaging forks pivotally mounted and limited in their pivotal movement in one direction for holding the engaging forks of the upper flight in a set position for engaging and conveying the beets upwardly, means for supporting the forks of the lower flight in an inoperative position, and means for rotating said driven shaft.

In testimony whereof I affix my signature in presence of two witnesses.

ANDREW ALOIS MATHISON.

Witnesses:
H. M. COLEMAN,
C. W. FORBES.